(12) United States Patent
Silas et al.

(10) Patent No.: US 9,127,705 B2
(45) Date of Patent: Sep. 8, 2015

(54) CONCRETE MASONRY ANCHOR AND METHOD OF FASTENING

(71) Applicant: 9170-9980 QUEBEC INC, Quebec (CA)

(72) Inventors: Gregory R Silas, Ontario (CA); Michael Silas, Quebec (CA); Robert Jeffrey Silas, Quebec (CA)

(73) Assignees: Gregory Robert Silas, Montreal, Quebec (CA); Michael Silas, Montreal, Quebec (CA); Robert Jeffrey Silas, Montreal, Quebec (CA)

( * ) Notice: Subject to any disclaimer, the term of this patent is extended or adjusted under 35 U.S.C. 154(b) by 0 days.

(21) Appl. No.: 14/093,203

(22) Filed: Nov. 29, 2013

(65) Prior Publication Data

US 2015/0152907 A1    Jun. 4, 2015

(51) Int. Cl.
| F16B 29/00 | (2006.01) |
| F16B 37/00 | (2006.01) |
| F16B 37/12 | (2006.01) |
| E04B 1/38  | (2006.01) |

(52) U.S. Cl.
CPC . *F16B 29/00* (2013.01); *E04B 1/38* (2013.01); *F16B 37/005* (2013.01); *F16B 37/12* (2013.01)

(58) Field of Classification Search
CPC .......... F16B 33/02; F16B 37/12; F16B 29/00; F16B 13/124; F16B 37/14; F16B 37/005; E04B 1/4121
USPC .......................... 52/705; 411/16, 17, 397, 411
See application file for complete search history.

(56) References Cited

U.S. PATENT DOCUMENTS

| 1,199,624 | A | * | 9/1916 | Smith | 411/17 |
| 2,520,232 | A | * | 8/1950 | Bereza | 411/423 |
| 2,933,007 | A |   | 4/1960 | Healy | |
| 3,316,795 | A |   | 5/1967 | Tann | |
| 3,710,305 | A |   | 1/1973 | Clark | |
| 3,771,104 | A |   | 11/1973 | Clark | |
| 3,945,070 | A | * | 3/1976 | Hauser | 470/18 |
| 4,309,135 | A | * | 1/1982 | Gutshall | 411/17 |
| 4,536,115 | A | * | 8/1985 | Helderman | 411/17 |

(Continued)

FOREIGN PATENT DOCUMENTS

| DE | 2836910 | 3/1979 |
| DE | 3627685 | 2/1988 |

(Continued)

OTHER PUBLICATIONS

EPO, Extended European Search Report relating to Application No. 14194227.6, dated Apr. 22, 2015.

*Primary Examiner* — Brian Glessner
*Assistant Examiner* — Adam Barlow
(74) *Attorney, Agent, or Firm* — Rowand LLP

(57) ABSTRACT

An anchoring assembly and method adapted to secure a screw fastener at a pre-drilled hole in a concrete, brick or masonry building material with an elongated engagement cavity between the screw and the pre-drilled hole radially offset to one side of and extending axially along the depth of the hole, an elongated anchor strip axially adjacent the screw including an elongated malleable and non-resilient anchor member adapted to frictionally engage both the helical threads and the building material and to frictionally engage the threads to the building material radially opposite to the engagement cavity, the malleable anchor member having at least one transverse dimension which is substantially greater than the transverse radial dimension of the axial engagement cavity.

19 Claims, 12 Drawing Sheets

(56) References Cited

U.S. PATENT DOCUMENTS

| | | |
|---|---|---|
| 4,541,680 A | 9/1985 | Johnston |
| 5,006,023 A * | 4/1991 | Kaplan .......................... 411/17 |
| 5,366,328 A * | 11/1994 | Helderman .................... 411/17 |
| 5,749,688 A * | 5/1998 | Wakai ............................ 411/42 |
| 8,747,042 B2 * | 6/2014 | Hagel et al. ................... 411/383 |
| 2011/0243683 A1 | 10/2011 | Howe et al. |

FOREIGN PATENT DOCUMENTS

| | | |
|---|---|---|
| DE | 19642914 | 4/1997 |
| DE | 19960835 | 6/2000 |
| EP | 1178569 | 2/2002 |

* cited by examiner

CONCRETE MASONRY ANCHOR AND METHOD OF FASTENING

FIELD OF THE INVENTION

The present invention relates to concrete and masonry anchors and methods of securely and removeably fastening construction materials to concrete slabs, concrete bodies, masonry blocks, and the like.

BACKGROUND

A screw is a fastener is a type of fastener characterized by a helical ridge, known as an external thread or thread, wrapped around a cylinder designed to cut a helical groove in a softer material as the screw is inserted. Commonly screws are used to hold objects together and to position objects. A screw has a head by which it is turned and thereby driven into the objects.

By contrast, a nail is a type of fastener which is driven into the objects by an axial blow or series of axial blows.

Concrete is a common construction material which is widely used for a variety of purposes including structural members, walls, floors, beams and the like. Concrete is a hard composite material including coarse granular components embedded in a hard matrix being the cement that fills the space among the aggregate particles and glues them together. Concrete is not malleable, ductile or resilient and is not known to permit plastic deformation of any kind once hardened. Similar to masonry and brick, concrete is considerably harder than most materials used for typical fasteners and is cut, drilled or threaded by vary hard abrasives or destructive impact tools. As such, concrete has a degree of non-uniformity which makes it difficult to precisely re-form, as by cutting and drilling, particularly on modern construction sites. This is particularly so when other building materials are to be attached or secured to a concrete member on site. Most often a pilot hole is required which would necessarily be irregular by reason of manual high-speed drilling tools such as a hammer drill or masonry bit. Such a pilot hole would have a nominal diameter and internal irregularities, which would include loose, partially detached and fully detached elements which could reduce or increase the nominal diameter.

The very hardness of concrete members and a high resistance to compressive forces makes on site attachment of other objects a common task which remains a time consuming, expensive and risk prone construction activity. This requires skilled labor and care in relation to supply of parts and their installation, both in relation to the object attached to the concrete, and the concrete itself.

PRIOR ART

Many solutions to this attachment task have been proposed, most of which are referred to as concrete or masonry anchors. The most common of these is referred to the Tapcon. This concrete screw is turned into a pre-drilled and cleaned hole of a specific size where its hardened and specialized threads cut radially into the concrete itself, creating a mating female thread pattern as the screw is advanced. Such concrete screws are commonplace and are often required by specification for economical construction which meets modern needs for high-speed installation with an extremely secure result.

In others attachment instances, radial deformation spreading in a soft material, such as lead, is used. An annular anchor expands its circumference as a result of expansion of an inner diameter caused by the action of an advancing screw or other means.

Such attachments are meant to be permanent and to resist variations in methods, tensile and vibration forces, corrosion and the like. Unfortunately, each of these solutions requires a specific size of anchor, screw, hole. Often these are inconsistent with the placement requirements for the objects being attached and they do not readily permit relocation or reuse should construction requirements change.

Attempts to provide a more economical, faster and equally secure means of attachment have been sought but are not widely adopted.

The patent prior art shows several separate classes of construction anchor, firstly the use of screw enveloping plugs, and, secondly, helical coils which can be placed in a receiving hole to provide a laterally expansible engaging thread which is then expanded by insertion of a threaded fastener.

An example of the first class is shown in U.S. Pat. No. 1,248,008 issued Nov. 27, 1917 to Pleister. A lead plug with a central open shaft is expanded by the insertion of an oversized screw so as to interact with pilot hole walls.

A simple example of the 2nd class is shown in U.S. Pat. No. 2,520,232 issued Aug. 29, 1950 to Bereza. That patent describes use of an expansible helical coil for fastening to a wood substrate. The screw is wound with the coil and then turned into the pre-prepared hole. Engagement in the reverse direction is asserted to occur by unwinding of the coil against the hole.

In U.S. Pat. No. 4,309,135 issued Jan. 5, 1982 to Gutshall it is asserted that it is well known to use an expandable helical coil for concrete fasteners where the coil is expanded into contact with the hole by a wedging action of a bolt or screw. Gutshall addresses this problem by providing a 2-part system comprising a speciality bolt and a specially formed coil which interact to complete an improved concrete anchor.

U.S. Pat. No. 4,536,115 issued Aug. 20, 1985 to Helderman describes a more complex helical coil structure which is inserted into a pre-drilled hole to a prescribed depth and then expanded radially over its circumference to embed into the wall of the hole (col 2, line 28). At col 2 line 52 the device is identified as being made of metal, plastic coated metal or other suitable material but the only coatings are referred to as frangible upon use in situ. The coil is further described as molded of plastic or die cast from metal. The main features are seen to be radial expansion so as to embed into the concrete.

Other examples appear in U.S. Pat. No. 5,006,023 issued Apr. 9, 1991 to Kaplan; U.S. Pat. No. 5,366,328 issued Nov. 22, 1994 to Helderman; U.S. Pat. No. 5,636,549 issued Jun. 10, 1997 to Devenyi; U.S. Pat. No. 6,835,036 issued Dec. 28, 2004 to Sigismund. Development in this area seems to continue as shown in USPPA 2003/0086772 published May 8, 2003 by Giannakakos; USPPA 2008/0025810 published Jan. 31, 2008 by Grubert; USPPA 2010/0221087 published Sep. 2, 2010 by Gillis; and USPPA 2012/0315107 published Dec. 13, 2012 by Grubert.

An example of yet another class is the fastener shown in U.S. Pat. No. 4,973,210 issued Nov. 27, 1990 to Osborne et al. In this it appears that the fastener threads include cutting teeth which seek to form female corresponding threads in the pre-drilled concrete pilot hole. It is noted that a locking key is required to prevent loosening of the connector. Other examples of cutting threads include U.S. Pat. No. 8,360,702 issued Jan. 29, 2013 to Yu.

Other examples are shown in U.S. Pat. No. 5,749,688 issued May 12, 1998 and U.S. Pat. No. 6,196,778 issued Mar.

6, 2001 to Wakai. These seek to provide a concrete plug with a first part having an axial bore to receive a screw and a second part having a pair of legs formed of a flexible plastic material. These legs form a irregular hole bounded by a single flexible plastic material. As shown in FIGS. 2A and 2B a starter hole is formed in the concrete or other building material sufficiently wide for insertion of the Wakai plug and a screw is passed through the axial bore and then is driven by twisting into the irregular hole. The plastic material is asserted to be deformed sufficiently by the screw threads to form flexible retaining female threads in the plastic material and the screw shank itself is driven laterally so that its hardened threads cut corresponding female threads in to the concrete building material. As noted at page 6, column 3, lines 50 to 67, two separate areas are said to provide both strong resistance to a pulling force and resilient absorption of vibrations for long-lasting pulling forces. These characteristics are asserted to provide a secure and long-lasting fastening system. The system is complex, uses speciality materials including hardened screws and requires a carefully matched pair of fasteners, the screw and the plug, each matched to the finished size of the receiving hole and the material being secured. It is not only expensive but prone to error in stocking and in use, particularly as it is difficult in an ordinary construction site to ensure perfectly drilled receiving holes and availability of matched parts of different sizes. The Wakai references are not known to be in common use or to be especially effective, as asserted.

It is apparent from these examples that the progress of the development in this art is provided by extensive efforts to maximize embedding of screw threads within the walls of the pre-drilled concrete pilot hole, or, alternatively, by expanding a circumferential plug to fill the void between threads and the pilot hole wall. In every case, a speciality part or parts are required, each of which is specifically sized to correspond with a particular use.

In modern construction none of the previously noted types of anchor are most common. Modern concrete anchors also include self threading anchors, bolts or screws, examples of which are supplied under the name Tapcon, a trade mark attributed to Illinois Tool Works Inc. With such screws a receiving hole is drilled into the concrete base to a full service depth. The self-threading screw anchors are screwed into the hole by passing through the part to be attached. Since the screws are hardened they are adapted to cut holding threads into the concrete wall material as by configuration and thread hardening. Necessarily the tolerances are low as even with a hardened or specially shaped cutting thread the hard and abrasive concrete of the hole wall must be overcome, firstly, to cut the thread in a single pass, and, then, to accommodate the sliding action of following threads and accumulating debris. All of the forces required to carry out this action must be transmitted down the shank of the anchor from its head. The actual cutting thread must maintain its shape and outer diameter throughout the process to achieve adequate holding power. In such instances there is often a need to pass the drill in/out of the pilot hole 2 to 4 times to clear debris. Unfortunately, too little means leftover debris in the hole and the hole is likely too narrow. Too many times and the hole is slightly too large or an irregular shape or both.

Removal of the concrete drilling debris to accommodate the action of such a bolt dictates a need to blow out the hole to remove concrete dust and drilling particles. This adds an additional installation step and additional equipment to the installation process, plus an additional power line for powered operation.

Concrete is a non-uniform and abrasive material into which it is difficult to drill a cylindrical hole with precision, especially on a modern work site with highly powered but yet hand held drilling devices.

If the hole is not the perfect size and shape, there is a need to screw-in and unscrew the bolt a few times to get the anchor all the way in, otherwise it may become wedged due to additional abraded material and can break off. Hardness of the material of the anchor and the concrete provide an ideal condition where torque loading requirements precipitously increase when a jam occurs. A jam leads to an unpredictable failure profile for the anchor, especially if the hole is slightly undersized in whole or in part as may arise with hand held drilling.

On the other hand, if the hole is slightly too big, these anchors will not work at all as they act as stripped thread.

As a result, self-threading anchors are often as much as 10 times the price of regular screws, require care in installation and are not reusable. In use, ease of use does not always occur as they often get stripped, wedged or broken off. Broken anchors at individually located drill sites themselves cannot be reused without significant remedial work or at all. In most circumstances if an anchor gets stuck or breaks off the project will require that the entire position of the material being fastened or the location of that fastening will need to be moved as you cannot typically drill out a wedged or broken anchor. Even cleared of a broken anchor and debris the resulting hole will be too big to reuse. Moving the fastening point may require changing the position or fastening location of the attached materials or equipment and will leave a weakness in the concrete. These result in significant incremental costs of the materials successfully used and the overall work project, effectively increasing the real cost of the ones that work.

Even so, these anchors are not forgiving, especially in the hands of even skilled trades under pressure to complete work as quickly as possible. The margin for error is small with regards to hole vs thread. Further, they need special bits, such as hex-head or large philips.

In the result, operating with these anchors requires a large inventory as much as doubling the job-site-available inventory of screws, typically in the range of 1" to 4" which adds greatly to the fastening costs of any project.

Other solutions are not known to be as widely adopted in the trades, such as use of a pair of standard construction nails and twisted concrete nails with and without a filler.

OBJECTS OF THE INVENTION

It is an object of the invention to provide a simple concrete anchor which is economical, faster to install, and an equally secure means of attachment using commonly available screws.

Further objects of the present invention include providing:
- a single pass drilling operation without a need to drill back and forth, to avoid a need to blow out the drilled hole,
- avoiding backing out the screw so that the screw goes in on the first attempt,
- a more forgiving anchor with a large margin of error for size of hole,
- for the use of regular screws in a manner where most are reusable,
- minimal breakage or stripping of the pilot hole,
- minimizing actual and incremental costs,
- for re-use same hole in the event of failure,
- accommodation for oversize holes,
- an easy means to remove the screw and try again while maintaining position, for use standard tool bits, such as a regular square or Phillips tips, and, for use of standard concrete drill bits to prepare anchoring holes.

THE INVENTION

The invention provides an anchoring assembly and method adapted to secure a screw fastener in a material engaging position at a pre-drilled hole in a concrete, brick or masonry building material, with an elongated screw with a threaded portion including a cylindrical shank and laterally extending helical cutting threads with an overall outside diameter less than the nominal diameter of a pre-drilled hole so as to provide an elongated engagement cavity between said screw and said pre-drilled hole, wherein said engagement cavity is radially offset from the axis of the screw to one side of the pre-drilled hole and extends axially along a substantial portion of the depth of the said pre-drilled hole, and an elongated anchor strip axially adjacent the screw including an elongated malleable and non-resilient anchor member adapted to frictionally engage both the helical threads and the building material in the engagement cavity and to frictionally engage the threads to the building material radially opposite to the engagement cavity, wherein said malleable anchor member has at least one transverse dimension which is substantially greater than the transverse radial dimension of the axial engagement cavity.

The invention also provides an anchor and method with at least one transverse dimension greater than the transverse dimension of the axial engagement cavity plus the difference between the radius of the shank and the radius of the helical cutting threads.

Further, the invention provides an anchor and method which is substantially non-resilient and preferably selected from the group of copper, aluminium or soft malleable steel, malleable under the stresses applied in manual drilling of concrete or masonry.

Further, the invention provides an anchor and method wherein the malleable core is plastically deformed within the engagement cavity by the threads and the pre-drilled hole and, also, by the screw shank, upon axial rotation of the screw.

Further, the invention provides an anchoring assembly with plastic deformation including both helical deformation of the elongated anchor strip and axial continuity of the strip along the engagement cavity and means to resist rolling of the strip about its own axis.

Further, the invention provides an anchoring assembly with an anchor strip including a resilient and malleable outer sheath member, preferably of nylon or PVC.

THE DRAWINGS

Figure 4:
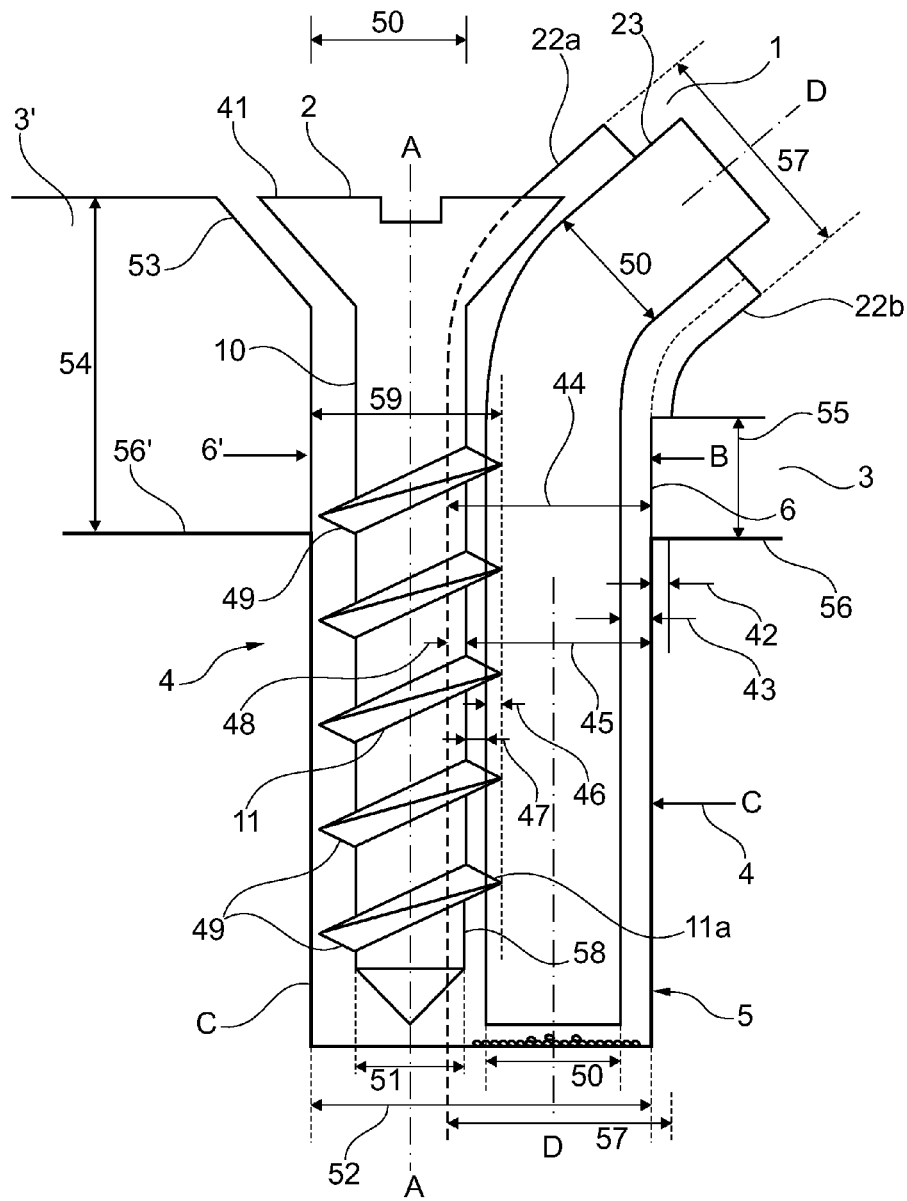
FIG. 4 is an illustrative vertical section of the installed anchor of FIG. 2 of the preferred embodiment.
Figure 4A:
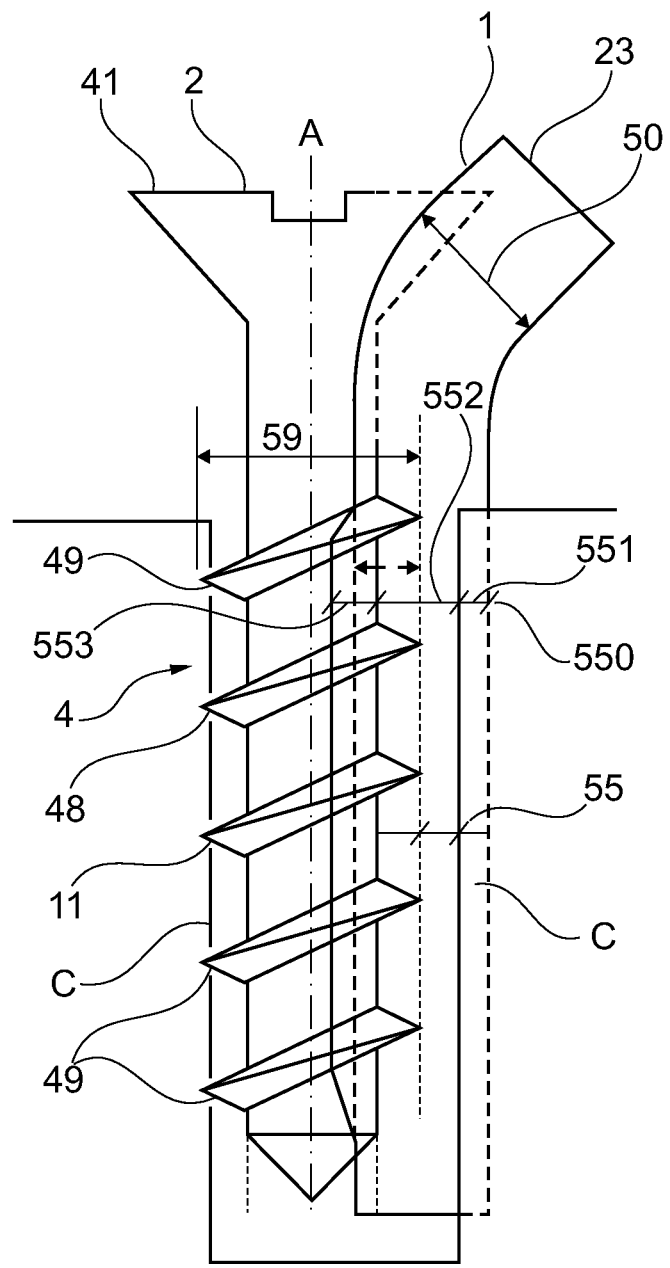

FIG. 4*a* is a further illustrative vertical section of the installed anchor of FIG. 4 of the preferred embodiment shown without a outer resilient sheath.

Figure 4B:
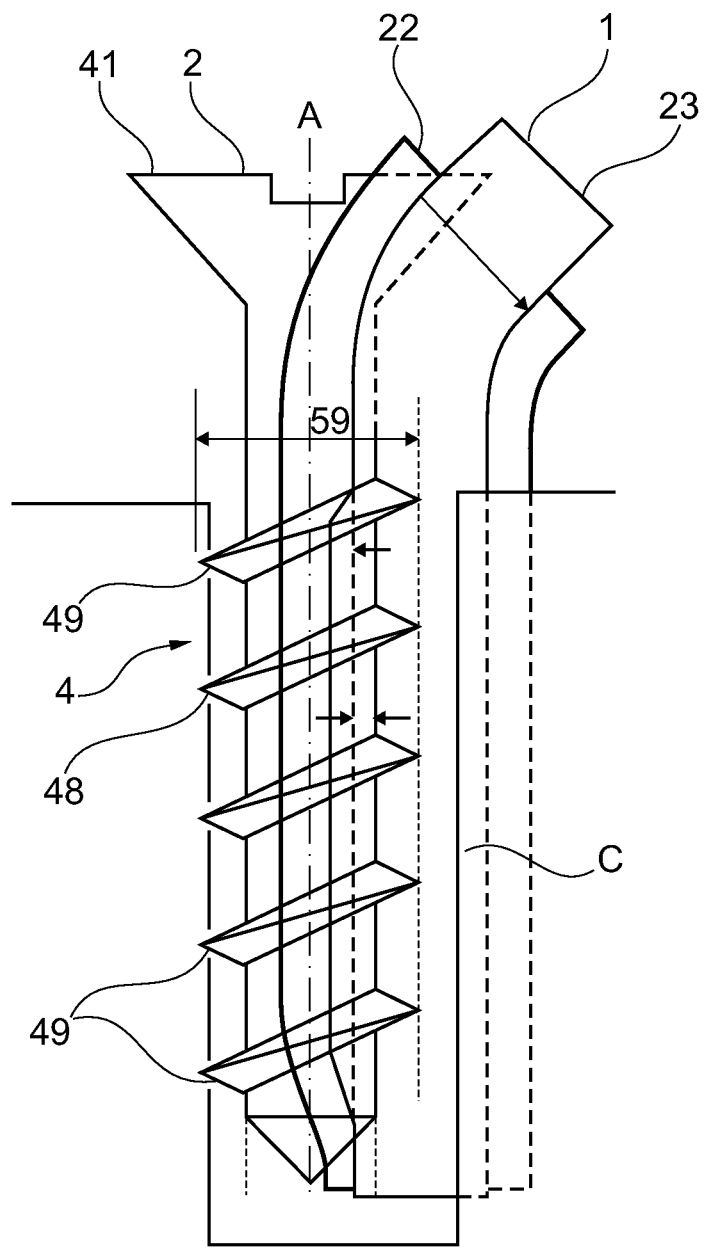

FIG. 4*b* is a further illustrative vertical section of the installed anchor of FIG. 4*a* of the preferred embodiment shown with the added outer resilient sheath.

FIGS. 5 through 9 show a sequence of pictorial views of a screw and anchor combination which has been installed and then removed from engagement by reversal of the driver and reverse axial rotation. In each successive case the screw remains unmoved and the anchor is incrementally rotated about its long axis.

Figure 8:
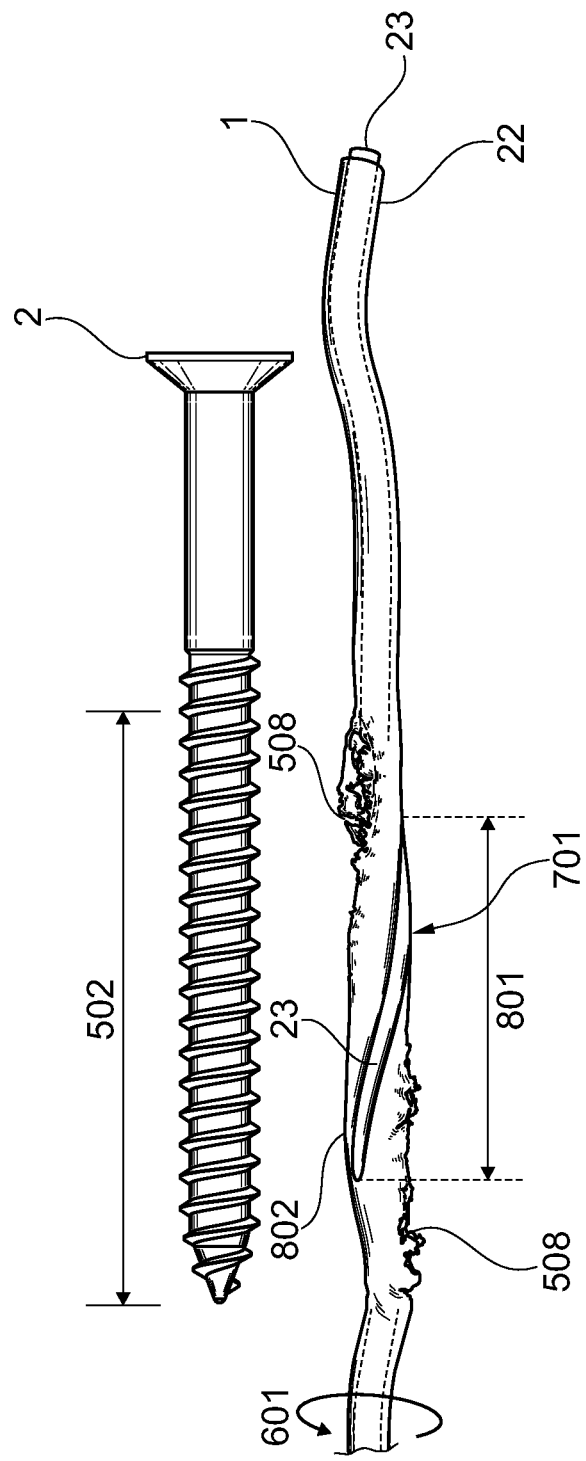
Figure 9:
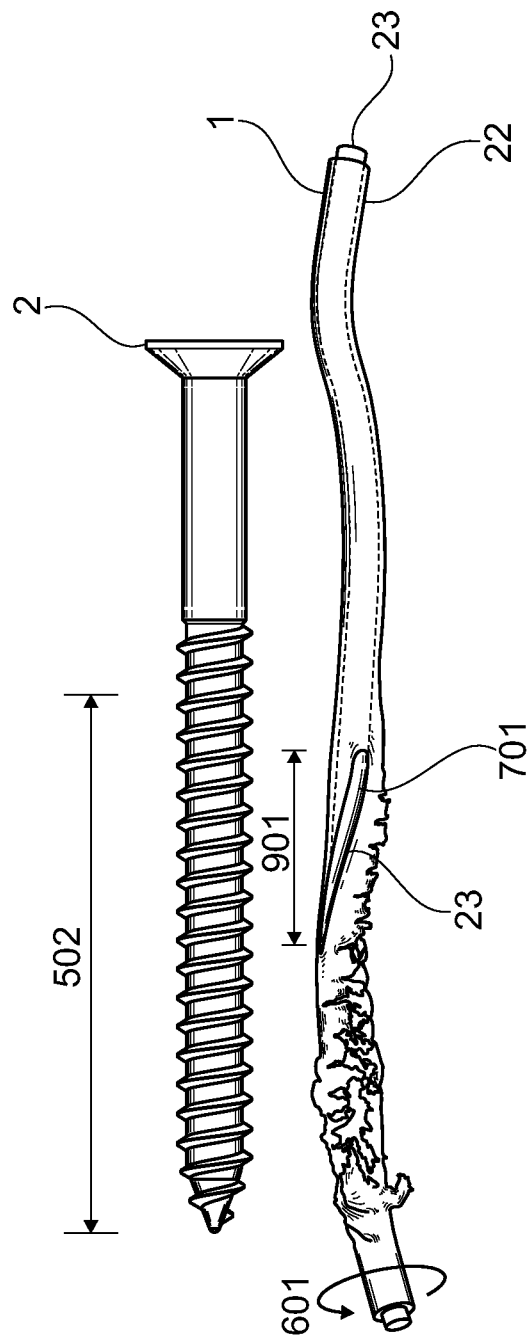
Figure 10:
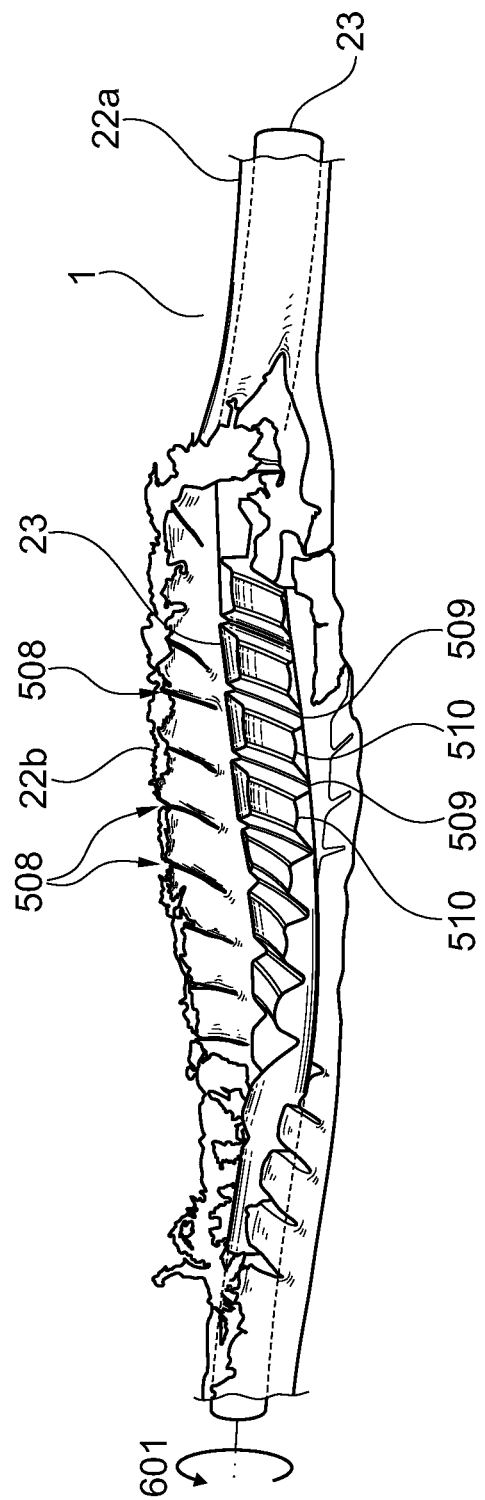

FIG. 10 is an expanded pictorial view of the anchor of FIGS. 5 through 9 wherein the rupture in the resilient sheath is opened to illustrate the deformations.

DESCRIPTION OF THE PREFERRED EMBODIMENTS

Figure 1:
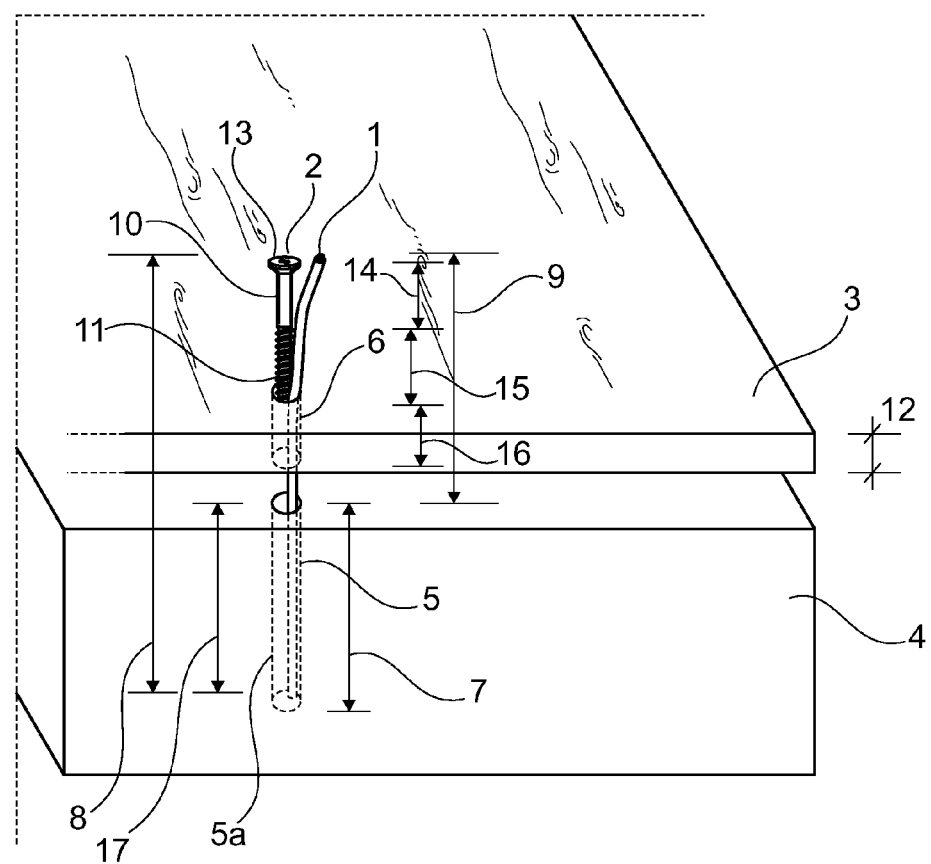
FIG. 1 is a partial perspective end view of a preferred embodiment of the anchor invention in a pre-anchoring condition.

A preferred embodiment of the concrete and masonry anchor of the invention is shown in FIG. 1. FIG. 1 is shown partially exploded for ease of reference in that the material being secured is separated from a the concrete base.

The anchor 1 is shown in the form of a cylindrical sheathed copper wire in conjunction with a coarse thread screw 2 and a construction material 3 with a thickness 12, such as plywood, being secured to a concrete or masonry base 4. For attachment, a pilot hole 6 is drilled through material 3 and well in to the base 4 to a depth 7, as at pre-drilled hole 5.

Anchor 1 as shown in this preferred embodiment is uniform in section over its length 8 and substantially smaller than hole 5. Anchor 1 is inserted in to pre-drilled hole 5 to a depth 17 forming its working length 17 and providing an axial elongated cavity inside hole 5. Working length 17 may or may not be the same as the depth 7 as the anchor need not extend through all of hole depth 7. As shown, anchor 1 extends beyond base 4 and hole 5 and through pilot hole 6 by its residual length 9. The exposed portion of anchor 9 adjacent lengths 14 and 15 may be used as a place holder since the anchor 1 may be gripped and held in place as by pliers (not shown).

Once material 3 is in place screw 2 is inserted into the axial elongated cavity provided by pilot hole 6 adjacent anchor 1 and turned axially by its head end 13 to engage its threaded portion 11 between anchor 1 and material 3. Preferably, screw 2 will preferably readily advance into pilot hole 6 a length 16 and through material 3 without significant resistance. In some cases, it will be understood, pilot hole 6 may be undersized or material 3 may be non-resilient as would be the case with attachment of metal or concrete parts.

Further axial rotation of screw 2 will cause it to advance into pre-drilled hole 5, preferably until threaded portion 11 with length 15 and 16 is completely engaged in pre-drilled hole 5 between concrete base 4 and anchor 1 over the whole of length 17. Most preferably, screw 2 will advance until it head end 13 engages fully with material 3 and draws it in to full engagement with the concrete base 4 with unthreaded portion 10 passing through material 3.

Preferably screw length 10 is chosen so that its unthreaded body portion 10 has a length 14 which corresponds to material depth 12.

The preferred embodiment of FIG. 1 is shown in a partially engaged position in a perspective overall view from the top surface of material 3. Pre-drilled hole 5 is shown with an expanding and over-sized diameter for ease of illustration of the anchor 1 and its method of installation.

Anchor 1 preferably includes a central cylindrical copper core 23 and an enveloping resilient sheath 22 of, preferably, nylon or PVC. Hole 5 may accumulate debris 21 from the drilling process and/or by the installation of anchor 1. As screw tip 20 advances in to hole 5 anchor 1 becomes compressively engaged between hole 5 and screw 2 by its threaded portion 11 and its main screw body. Rotation of screw 2 drives anchor 1 in to a long helical shape 24 whose lead is much greater than the lead of screw 2. Preferably helical shape 24 is no longer a regular cylinder.

Figure 2:
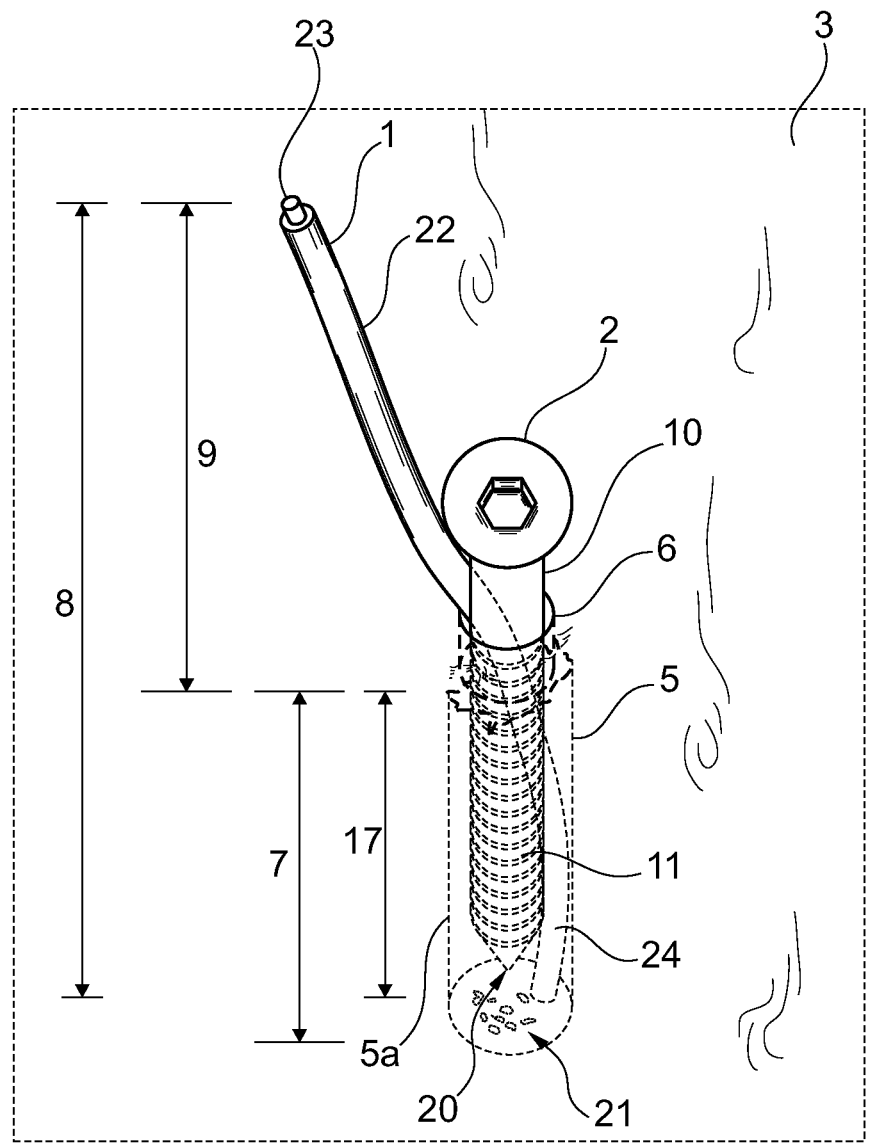
FIG. 2 is a partial perspective top view of the embodiment of FIG. 1 in an engaged anchoring state showing an enlarged pre-drilled hole diameter for illustration purposes.
Figure 3:
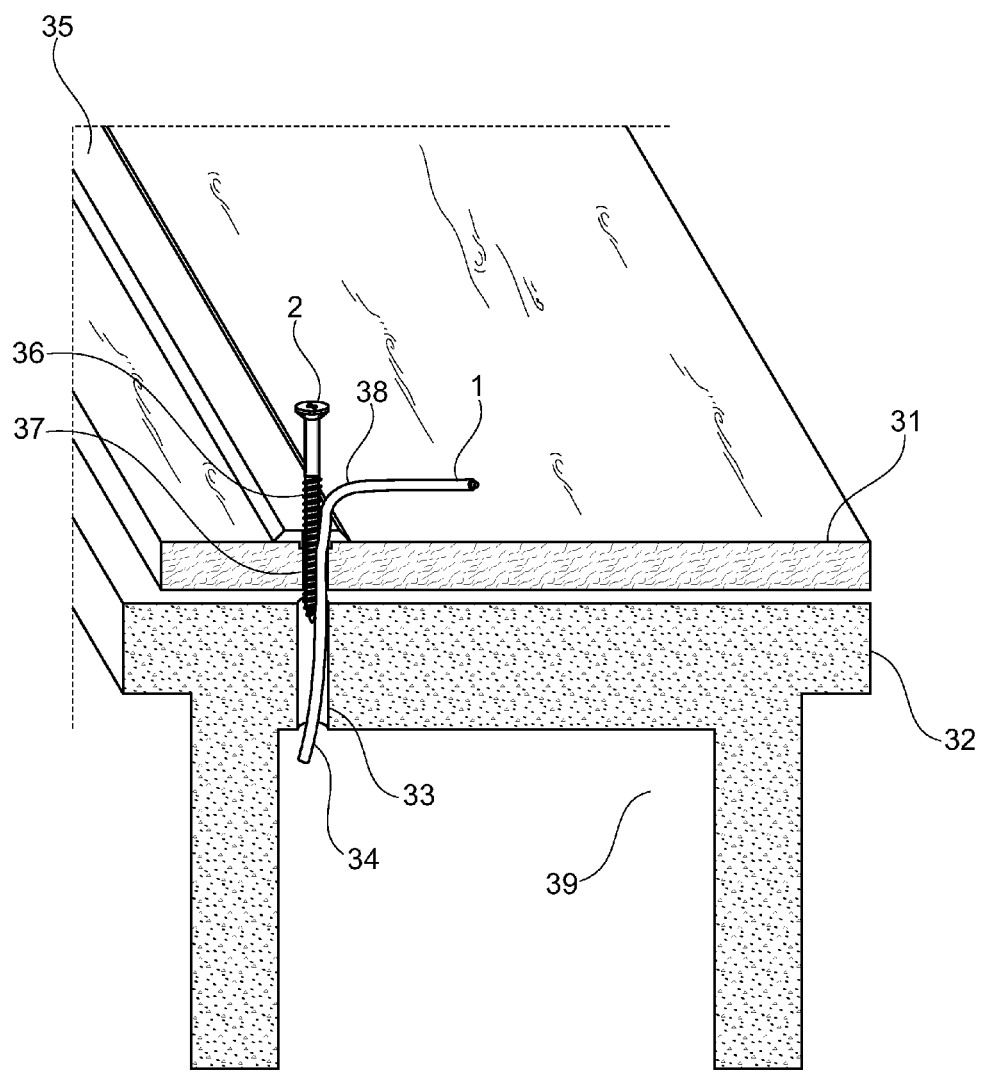
FIG. 3 is a partial perspective end view of the anchor of FIG. 1 engaging a composite building structure to a masonry block also showing an enlarged pre-drilled hole diameter for illustration purposes.

In FIG. 3 anchor 1 and screw 2 of FIGS. 1 and 2 are shown engaging a composite building structure to a masonry block. In FIG. 3 the pre-drilled hole 33 corresponding to pre-drilled hole 5 in FIGS. 1 and 2 is shown with an enlarged diameter for illustration purposes. Construction material 31 and metal strapping 35 are both to be engaged to hollow masonry block 32 which would include regular cavities 39. For installation, anchor 1 is fed in to and through pilot hole 36 and pre-drilled hole 33 so a to preferably extend somewhat into cavity 39 as at 34. Anchor 1 may then be bent over as at 38 so as to hold it in position against falling through or, in the case of an overhead installation, falling out of pre-drilled hole 33. Turning screw 2 axially advances threaded portion 37 through strapping 35 and material 35 into engagement between anchor 1 and the masonry wall of pre-drilled hole 33 until its head draws the strapping 35 fully tight against the masonry block 32.

FIG. 4 is an illustrative vertical section of an embodiment of the anchor of FIG. 2 also with an expanded horizontal diameter of pre-drilled hole 5. To the right of screw axis A-A material 3 is shown thin as at 55 and fully engaged to concrete 4 as at 56. To the left of screw axis A-A material 3' is shown as thicker, as at 54, to demonstrate engagement between screw head 41 and surface 53 and drawing down of material 3 into tight engagement with concrete 4 as at 56'.

Anchor 1 is shown with a central axis D-D fully extended into a pre-drilled hole 5 with a nominal diameter 52 as shown. Such pre-drilled holes 5 are known to be somewhat irregular due to the hardness of the concrete itself and the usual procedures for on-site drilling. Anchor diameter in its uncompressed state 57 includes a cylindrical malleable core element 23, preferably formed of copper or aluminium or other substantially non-resilient material, with a nominal diameter 50 surrounded by a sheath of resilient material 22 with lateral extremities 22a and 22b.

In FIG. 4 screw threaded portion 11 and screw axis A-A are offset from the central axis of hole 5 so as to have direct engagement between thread teeth 49 and concrete 4 opposite anchor 1 as the anchor is driven laterally. For ease of illustration, a small gap is shown in FIG. 4 between teeth 49 and concrete 4 as the wall of hole 5 on a construction site may include irregularities which do not conform to the shape of threaded portion 11.

Overall, hole diameter 52 is significantly greater than the outside diameter of threaded portion 11. The lateral extremity 22b of sheath 22 engages material 3 as at B and is compressed, preferably out of round. Pilot hole 6 may be slightly larger than pre-drilled hole 5 but these are shown with the same diameter in this Figure for ease of illustration. Most preferably, pilot hole 6 and pre-drilled hole 5 are drilled at the same time on site using a standard size concrete drill, such as 3/16 inch.

The nominal outside diameter 57 of anchor 1 is compressed against the concrete 4 by an amount 42, leaving, in one embodiment, a remaining nominal diameter 44 and residual amount of sheath material as at 43 between the core and the wall C. Sheath amounts 42 and 43 may vary due to irregularities in the hole wall C and by the amount of compression applied by the advancement of screw 2. Preferably, as with a number ten 3½ inch screw residual sheath amount 43 may be reduced to zero or near zero as the core 23 is driven laterally towards and to the side C of hole 5 and its shape is deformed circumferentially of hole 5. Most preferably, residual amount 43 is zero through the larger portion of hole 5 as the core 23 is driven laterally completely through the outer sheath 23 of anchor 1 along a substantial portion of its length. Core 23 may engage wall C axially of the hole 5 or, most preferably, in an elongated helical form as shown in FIG. 2 where the lead 24 of the core helix is more than, and preferably 3-6 or more times more than, the lead of screw 2.

Since elongated cavity 5a is narrower than the hole diameter 52 less anchor diameter 57, male screw threads 11 cut corresponding female threads in to and, preferably, through sheath 22a within the elongated cavity as shown in FIG. 4. Thread outside diameter 59 is significantly greater than the diameter 52 of the hole 5 less the nominal anchor outside diameter 57 and, preferably, less the compression amount 42. As shown in FIG. 4 threads cut into core 23 by an depth 46 leaving a radial space of depth 47 between the unthreaded core 58 of screw 2 (diameter 51) and the internal edge of core 23. Further, resilient sheath 22a will be axially compressed and, preferably, axially ruptured as its remaining diameter (57 less 42) is greater than the radial width of hole 5, namely less than diameter 52 less screw diameter 59.

Most preferably, anchor diameter 57 is equal to or greater than the space 45 between the hole wall C and the unthreaded body cylinder of screw 2 resulting in significant circumferential deformation of anchor core 23 and rupturing of sheath 22 both between the screw 2 and the core 23 and between the core 23 and the wall C. Ruptured sheath material is driven into remaining spaces in the elongated cavity 5a.

In FIG. 4a the preferred embodiment is shown without any sheath on anchor 1, namely as a malleable non-resilient core 23 of copper, aluminium or like metal or equivalent. In this Figure anchor core 23 is shown in vertical section as being radially compressed at 550 in an cumulative fashion. Core 23 is compressed to wall C in a radial dimension as at 551. Core 23 is also compressed to the screw 2 in a radial dimension as at 553 and around threads 11 as at 552 so as to maintain an axial core body of radial width 554. As can been seen in FIG. 4a core 23 is molded circumferentially, axially and radially to fill and overfill the spaces between screw unthreaded cylinder body of screw 2 resulting in an circumferential increase in the dimension of core 23 and full contact between core 23 and all surfaces of screw threaded portion 11.

In FIG. 4b the preferred embodiment of the anchor 1 including a resilient sheath 22 is a further illustrated in vertical section. Compression of the core 23 ruptures resilient sheath 22 along both sides in an axial fashion, preferably including long helical contacts between the core 23 and the remaining sheath 23 and each of screw 2 and wall C. Resilient sheath 22 is deformed in to remaining elongated cavities on both sides of core 23 in full contact between the screw 2, the wall C and the core 22.

FIGS. 5 through 9 show a sequence of plan views of a single screw (#12) and anchor pair of the preferred embodiment. In each of these Figures the anchor and screw have been installed in concrete and then removed by reversal of turn about the screw axis and simple withdrawal from pre-drilled hole 5. In each successive Figure anchor 1 is rotated axially about its length as at 601.

Figure 5:
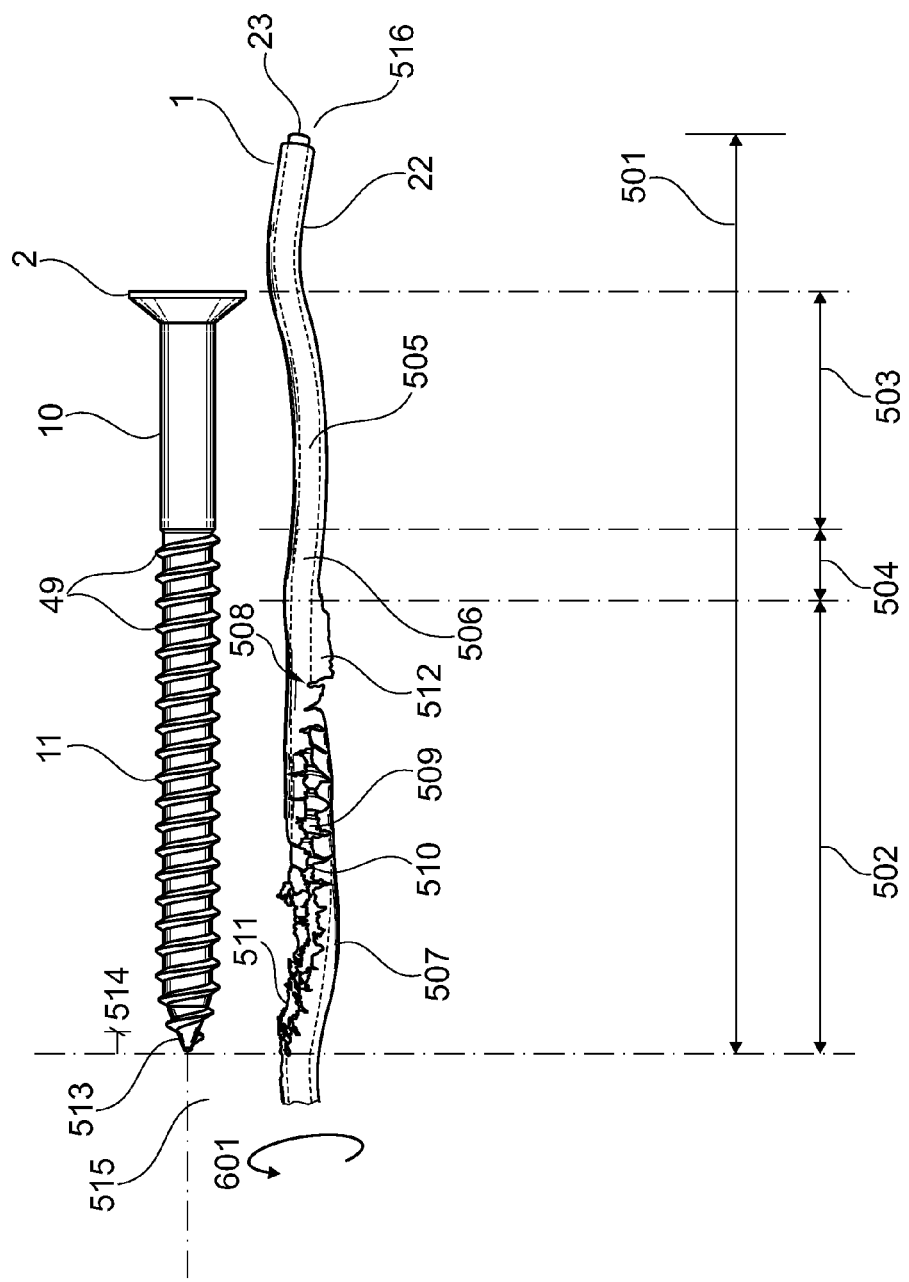

In FIG. 5 anchor 1 is shown with an overall length 501. Anchor 1 includes an area of full interaction with screw 2 over ruptured distance 502 plus a compressed length 504 and a relatively intact length 503. The threaded length 11 of screw 2 corresponds to both ruptured length 502 and compressed length 504.

As screw point 513 engages with the elongated cavity 5a thread teeth 49 cut into and deform resilient sheath 22 circumferentially expanding the resilient material into the elongated space 5a while reducing its radial dimension as shown at 506 in comparison with relatively unchanged portion 505. Advancement of the screw 2 cuts a series of lateral cuts 508 transverse to the screw axis and generally parallel to the angle of the screw thread. As advancement continues sheath 22 is ruptured between the core 23 and the screw 2 as shown at 512. The anchor is twisted about its length into an expanded long lead helical shape as at 507 several to many times the lead length of threaded portion 11. As screw 2 nears the bottom of pre-drilled hole 5 and the distal end 515 of anchor 1 its point 513 compresses the anchor less and less as in length 514 and rupturing deformations 509 gradually cease as at 511.

Figure 6:
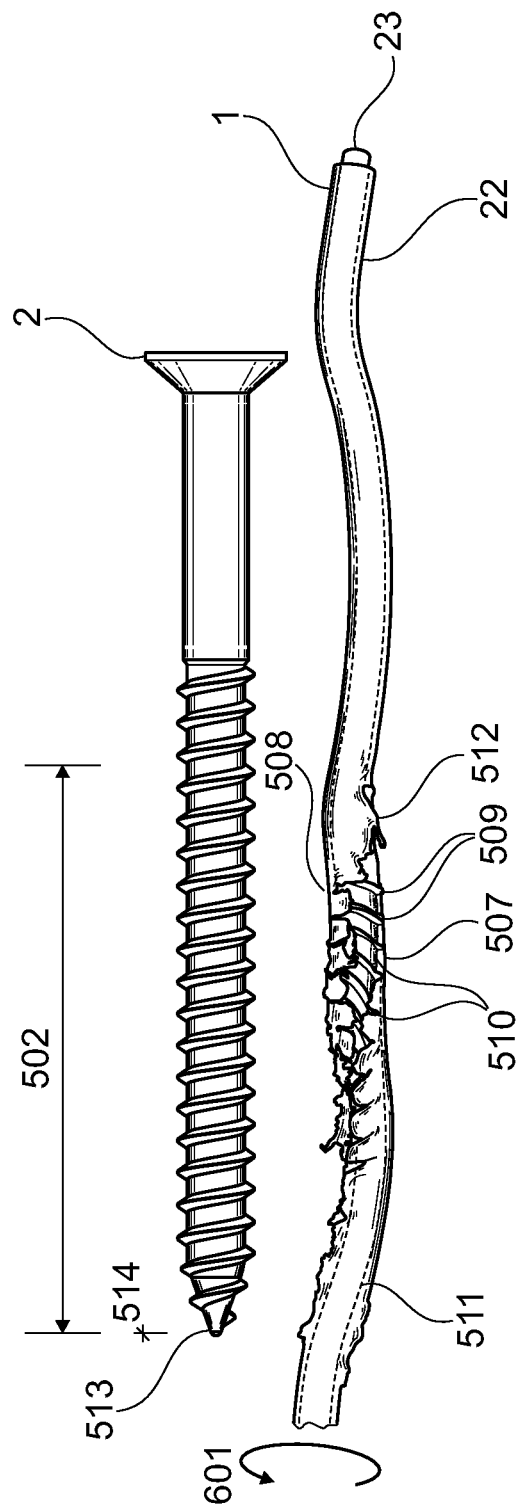

In FIG. 6 anchor 1 is rotated by about 35 degrees axially from FIG. 5. Rupturing of sheath 22 has exposed core 23 to a combination of axial, lateral and circumferential deformation as at 507 to form a series of cut grooves 509 separating a series of lands 510 each of which is a general trapezoidal shape with a curved interior surface.

Figure 7:
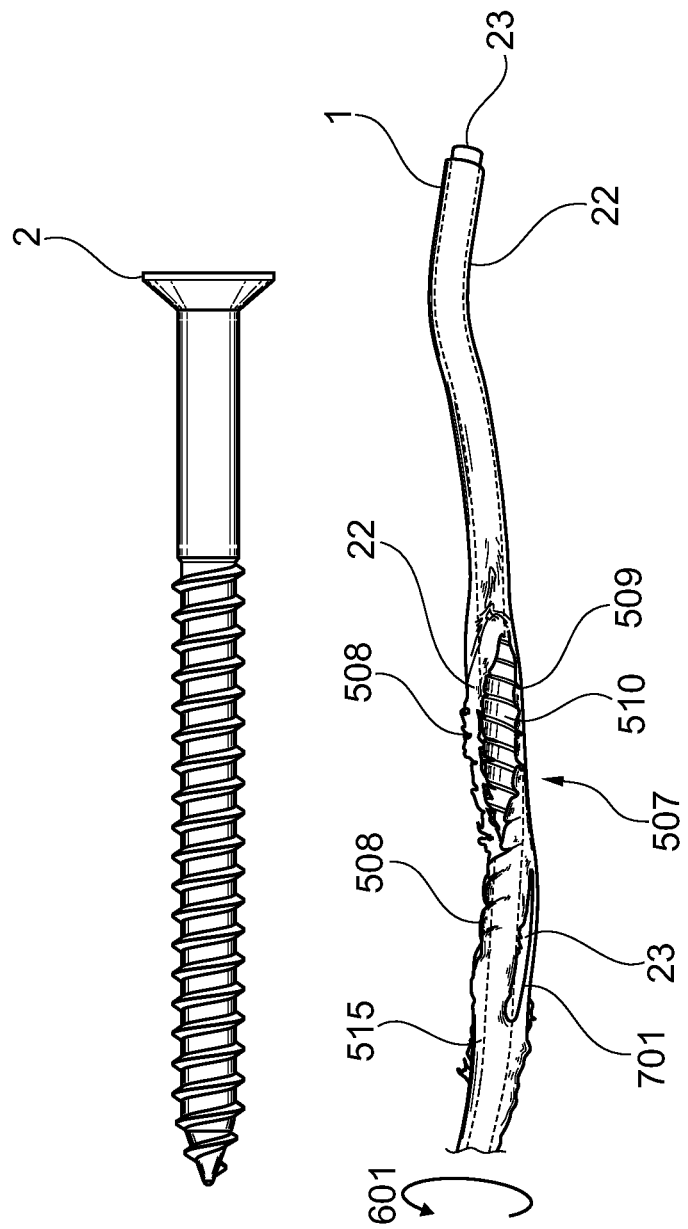

A further rotation of anchor 1 by about 35 degrees is shown in FIG. 7. Anchor core 23 has been compressed entirely through resilient outer sheath 22 so as to come in direct contact with wall C under compression from screw 2 in the form of an elongated helical contact shape 701.

A still further rotation of anchor 1 is shown in FIG. 8 wherein helical contact shape 701 is shown to extend over a substantial length of anchor 1 as at 801 while resilient outer sheath remains intact as at 802 at least insofar as the compressive side of the twisting.

A yet further rotation of anchor 1 is shown in FIG. 9 where helical contact shape 701 is shown to extend in the preferred embodiment to about a full rotation of screw 2 as by distance 901.

Variations of the above described anchor and anchoring system, method, structures and components will be apparent to those skilled in the art and such variations are considered to be within the scope of the present invention. Thus, modifications and alterations can be used in the system and method of the present invention without departing from the scope of the invention.

What we claim is:

1. An anchoring assembly adapted to secure a screw fastener in a material engaging position at a pre-drilled hole in a concrete, brick or masonry building material, said anchoring assembly comprising:
    (a) an elongated screw including a torque driven head and a threaded portion adapted to advance into building materials by means of torque applied to said head,
    (b) wherein said threaded portion includes a cylindrical shank and laterally extending helical cutting threads with an overall outside diameter less than the nominal diameter of the pre-drilled hole so as to provide an elongated engagement cavity between said screw and said pre-drilled hole,
    (c) wherein said engagement cavity is radially offset from the axis of said screw to one side of said pre-drilled hole and extends axially along a substantial portion of the depth of the said pre-drilled hole; and
    (d) an elongated anchor strip extending longitudinally generally parallel to and axially adjacent to said screw and including an elongated malleable and non-resilient anchor member adapted to frictionally engage both said helical threads and said building material in said engagement cavity and to frictionally engage said threads to said building material radially opposite to said engagement cavity,
    (e) wherein said malleable anchor member has a lateral thickness greater than the lateral width of said engagement cavity.

2. An anchoring assembly as claimed in claim 1 wherein said lateral width of said engagement cavity is the difference between the diameter of the pre-drilled hole and the said outside diameter of said cutting threads.

3. An anchoring assembly as claimed in claim 2 wherein said lateral thickness of the malleable anchor member is greater than the said lateral width of said engagement cavity plus the difference between the radius of said shank and the radius of said helical cutting threads.

4. An anchoring assembly as claimed in claim 3 wherein said anchor member is substantially non-resilient.

5. An anchoring assembly as claimed in claim 3 wherein said malleable anchor member is plastically deformed within said engagement cavity by said threads and said pre-drilled hole upon axial rotation of said screw.

6. An anchoring assembly as claimed in claim 5 wherein said plastic deformation further comprises deformation by said shank within said engagement cavity.

7. An anchoring assembly as claimed in claim 6 wherein said plastic deformation includes helical deformation of said elongated anchor strip and axial continuity of said strip along said engagement cavity.

8. An anchoring assembly as claimed in claim 7 wherein said anchor strip includes a resilient and malleable sheath member.

9. An anchoring assembly as claimed in claim 3 wherein said anchor member is an elongated cylinder.

10. An anchoring assembly as claimed in claim 9 wherein said sheath member envelops said anchor member.

11. An anchoring assembly as claimed in claim 9 wherein said anchor member is selected from the group of copper or aluminium wire.

12. An anchoring assembly as claimed in claim 11 wherein said sheath member said sheath member envelops said anchor member and is formed of a plastic.

13. An anchoring assembly as claimed in claim 12 wherein said plastic comprises nylon or poly-vinyl-chloride.

14. A method of anchoring a screw fastener in a material engaging position at a pre-drilled hole in a concrete, brick or masonry building material, comprising:
    (a) selecting an elongated screw including a torque driven head and a threaded portion adapted to advance into building materials by means of torque applied to said head;
    (b) wherein said threaded portion includes a cylindrical shank and laterally extending helical cutting threads with an overall outside diameter less than the nominal diameter of the pre-drilled hole so as to provide an elongated engagement cavity between said screw and said pre-drilled hole;
    (c) wherein said engagement cavity is radially offset from the axis of said screw to one side of said pre-drilled hole and extends axially along a substantial portion of the depth of the said pre-drilled hole;
    (d) selecting an elongated anchor strip including an elongated malleable and non-resilient anchor member adapted to frictionally engage both said helical threads and said building material in said engagement cavity and to frictionally engage said threads to said building material radially opposite to said engagement cavity;

(e) wherein said malleable anchor member has a lateral thickness greater than the lateral width of said axial engagement cavity;

(f) inserting said anchor strip into said pre-drilled hole, wherein said anchor strip extends longitudinally into said pre-drilled hole and is generally parallel to and axially adjacent to a center axis of said pre-drilled hole; and, (g) advancing said screw into said engagement cavity.

15. A method of anchoring a fastener as claimed in claim 14 further wherein said malleable anchor member has a lateral thickness greater than the lateral width of said engagement cavity plus the difference between the radius of said shank and the radius of said helical cutting threads.

16. A method of anchoring a fastener as claimed in claim 15 wherein said advancing includes advancing said screw fully in to said engagement cavity and drawing a construction material into material engagement with said concrete, brick or masonry building material.

17. An anchoring assembly to attach material to concrete, brick or masonry building material, the building material having a pre-drilled hole with a longitudinal axis and a hole diameter, said anchoring assembly comprising:

an elongated screw having a cylindrical shank and laterally extending helical cutting threads with a threaded diameter and a smaller shank diameter; and an elongated anchor having an elongated malleable non-resilient core and a surrounding resilient sheath, the anchor having an anchor diameter and the core having a core diameter, wherein the elongated anchor extends longitudinally within the pre-drilled hole substantially parallel to and offset from the longitudinal axis, wherein the anchor diameter and threaded diameter together are greater than the hole diameter, such that the helical cutting threads cut into and frictionally engage both said building material on at least one side of the hole and the elongated anchor on at least another side of the hole, and wherein, the elongated anchor is compressed and frictionally engages both said helical threads and said building material.

18. The anchoring assembly claimed in claim 17, wherein said threaded diameter and said core diameter are greater than the hole diameter, such that the helical cutting threads cut through the resilient sheath and part way into said core, and wherein compression of said anchor member against a wall of the pre-drilled hole ruptures said resilient sheath and deforms said core.

19. The anchoring assembly claimed in claim 18, wherein said helical cutting threads make transverse cuts into said core, the transverse cuts being generally perpendicular to the elongated anchor.

* * * * *